United States Patent
Lindenthal et al.

(10) Patent No.: US 7,338,381 B2
(45) Date of Patent: Mar. 4, 2008

(54) SPIDER AND UNIVERSAL JOINT ARRANGEMENT

(75) Inventors: Hans Lindenthal, Heidenheim (DE); Peter Grawenhof, Dettingen (DE); Holger Wegmann, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 203 days.

(21) Appl. No.: 10/544,045

(22) PCT Filed: Dec. 16, 2003

(86) PCT No.: PCT/EP03/14304

§ 371 (c)(1),
(2), (4) Date: Sep. 13, 2005

(87) PCT Pub. No.: WO2004/067981

PCT Pub. Date: Aug. 12, 2004

(65) Prior Publication Data

US 2006/0100023 A1    May 11, 2006

(30) Foreign Application Priority Data

Jan. 31, 2003  (DE) ............................... 103 04 120

(51) Int. Cl.
*F16D 3/42* (2006.01)
(52) U.S. Cl. ...................................... 464/131; 464/136
(58) Field of Classification Search ........ 464/128–136; 384/127
See application file for complete search history.

(56) References Cited

U.S. PATENT DOCUMENTS 1,108,567 A * 8/1914 Fox ............................ 464/132
4,077,235 A * 3/1978 Kleinschmidt et al. ..... 464/130
4,664,643 A   5/1987 Cusati ........................ 464/131

(Continued)

FOREIGN PATENT DOCUMENTS

DE   42 11 757   10/1993

(Continued)

*Primary Examiner*—Greg Binda
(74) *Attorney, Agent, or Firm*—Baker & Daniels LLP

(57) ABSTRACT

A spider, for a universal joint for prop shafts suitable for the transmission of torque, comprising pins arranged around a mid-point and extending from the base body in pairs about a common axis, whereby the axes cross at the center of the spider at a right angle. Each pin comprises a surface arranged concentrically about the corresponding pin axis forming a running surface, or has a running surface for the rollers of a roller bearing and a transition region between the surface forming, or supporting a running surface and the base body. The spider is characterized by the following features:—functional surfaces for the support of at least one sealing device with formation of a seal surface of a sealing pair on the front face of the base body facing the pin, on each pin, said functional surface runs perpendicular to a plane which runs from the pin axis of the corresponding pin to an adjacent pin in the circumferential direction, the functional surface runs from the transition region to at least a region in the radial direction about the pin axis which may be described by a radius which corresponds to at least 1.5 times the radius of the pin and each functional surface is provided with at least one centering surface perpendicular thereto for the bearing mounting of a seal holder supporting the sealing device.

19 Claims, 3 Drawing Sheets

U.S. PATENT DOCUMENTS

| | | | |
|---|---|---|---|
| 5,407,387 A | 4/1995 | Mazziotti et al. | 464/131 |
| 5,989,125 A | 11/1999 | Lindenthal | 464/136 |
| 6,059,663 A | 5/2000 | Jones et al. | 464/133 |
| 6,224,489 B1 * | 5/2001 | Gille et al. | 464/136 |
| 2004/0166947 A1 | 8/2004 | Mizuno et al. | 464/131 |

FOREIGN PATENT DOCUMENTS

| | | | | |
|---|---|---|---|---|
| DE | 196 01 290 | 7/1997 | | |
| DE | 299 20 839 | 3/2000 | | |
| EP | 1 213 502 | 6/2002 | | |
| JP | 61-048615 | 3/1986 | | |
| SU | 1583200 A1 * | 8/1990 | | 464/132 |
| WO | WO 80/01827 A1 * | 9/1980 | | 464/131 |
| WO | WO 03/102435 | 12/2003 | | |

* cited by examiner

SPIDER AND UNIVERSAL JOINT ARRANGEMENT

BACKGROUND OF THE INVENTION

The invention relates to a spider for universal-joint arrangements for prop shafts suitable for the transmission of torque.

Spiders for use in universal-joint shaft arrangements are known in a number of embodiments. As a general rule, the design and physical form of the geometry of the spider depends on the concrete constructive conditions and the desired mounting in a link yoke. Document DE 196 01 290 A1 is referenced as a representative example. The universal-joint shaft arrangement described therein comprises a spider, two link yokes provided to mount the pins of the spider, whereby each pin of the spider is mounted by means of a bearing arrangement, comprising a radial bearing with an outer ring and an inner ring and an axial bearing, in an attached yoke eye of the link yoke. Furthermore, an external collar, which is first in the installation position in the axial direction and directed towards the pin axis of the pin mounted in the link yoke and at least indirectly forms an axial stop for the fit of the inner ring in the frontal area of the pin, is attached to the inner ring. The first outer collar attached to the inner ring of the radial bearing can be connected in a force- and/or form-fitting manner with the pins mounted in the link yoke and/or is partially reinforced by the pins mounted in the link yoke. A second inner collar is attached to the inner ring in the installation position in the axial direction and extends radially away from the pin axis of the pin mounted in the link yoke. The inner collar of the inner ring thereby forms at least indirectly the outer contact surface of the axial bearing in the axial direction. Furthermore, the outer ring of the radial bearing also has a first inner collar in the axial direction, which extends radially in the direction of the pin axis of the pin mounted in the link yoke. The inner collar of the outer ring of the radial bearing thereby forms at least indirectly the inner contact surface of the axial bearing in the axial direction. The lubricant supply of the bearing arrangement is further sealed off from the environment via a sealing arrangement, which is reinforced by the pin root and is arranged between the inner ring and the outer ring of the axial bearing. However, the replacement of these individual seals requires the complete dismantling of the entire bearing assembly. This can, in particular in the case of very large universal-joint shafts, lead to considerable problems, in particular due to the amount of time required. Furthermore, the dismantling of the entire bearing arrangement can also lead to the damaging of other individual elements, in particular the other parts of the seals. There are known versions with seal holders carrying the seal; however, as a general rule, these are reinforced by the link yoke or are attached to it. Deformations of this part thus have a negative effect on the actual sealing function.

Supports of the seal holder on the spider are described in the document EP 1 213 502 A1, the unpublished WO 03/102435 A1 as well as the documents U.S. Pat. No. 4,664,643 and U.S. Pat. No. 6,059,663. EP 1 213 502 A1 discloses an embodiment of a spider with a cube-shaped base body, on which the seal holder is supported. It carries the seal. The seal holder lies against the base body. This is designed such that the immobilization is determined by the type of seal. Relative movements caused by deformations cannot be excluded, which in turn leads to the damaging of the seal surfaces. Furthermore, the seal holder is arranged below the radial bearing in the axial direction such that this space is to be taken into consideration when arranging the spider and the bearing assembly.

The U.S. Pat. No. 4,664,643 discloses a sealing device, which is designed as an integral unit. A seal holder is not provided. The seal is connected in a form-fitting manner with the pin.

U.S. Pat. No. 6,059,663 discloses a version with seal holder, which is supported in the bearing bushing of the radial bearing. Deformations of the bearing bushing are also transferred to the seal holder. The seal function is thus not always guaranteed.

SUMMARY OF THE INVENTION

Thus, the object of the invention is to design a universal-joint shaft arrangement of the initially named type such that, in addition to the ensuring of a secure sealing function, an easy exchangeability of the seal is possible. Furthermore, the spider should be characterized by little constructive effort and should be suitable for the transfer of very high torque.

In accordance with the invention, the support of the seal and the seal holder are performed by the spider. The spider for a universal-joint shaft comprises a base body arranged around the center point and four pins extending from the base body in pairs with a common axis, whereby the axes cross at the center point of the spider at a right angle. Each pin has a surface arranged concentrically around the respective pin axis that directly forms a contact surface for the rolling elements of a roller bearing or a support surface for the element carrying the contact surface for rolling elements in the roller bearing. A transfer area is provided between the surface and the base body. In accordance with the invention, a functional surface is provided on the base body for the support of at least one sealing device by forming a sealing surface for a seal pairing. The functional surface thereby runs perpendicular to a plane, which is defined by the pin axis of the respective pin and a neighboring pin in the circumferential direction. The functional surface thereby extends from the transfer area at least to an area, which is characterized by a separation distance from the pin axis, which is equal to or greater than 1.5 times the length of the radius of the pin. Furthermore, a centering surface for the element carrying the seal is attached to the functional surface and is arranged perpendicular to the functional surface forming the seal surface.

The sealing function of the functional surface takes place according to the invention on the large diameter on the base body. The notch run caused by the arrangement of the centering surface is located in a low-stress area at a very large distance from the actual pin axis. Thus, additional functional elements on the spider can experience support that is free of the hindrance of the transfer of power.

In accordance with a particularly advantageous embodiment, the entire functional surface is arranged planar. This gradient is particularly suitable for the requirements for the realization of a seal pairing by designing the functional surface at least partially as a sealing surface of a tangential seal. The functional surface can thereby extend over the entire front surface running from the base body perpendicular to the plane defined by the pin axis. In this case, each of the neighboring front surfaces function as centering surfaces, whereby they can also take on the function of a functional surface. This embodiment represents a high level of functional centralization.

In accordance with another embodiment, the functional surface only partially extends over the front surface, which is arranged perpendicular to the plane formed by the pix axes of two pins, which are arranged next to each other in the circumferential direction, and around the pins in the radial direction. The base body itself can be designed like a cube so that, in this case, the centering surface attached to the functional surface also extends perpendicular to it and another fastening surface running perpendicular to the centering surface is also formed. This fastening surface is thereby arranged parallel to the functional surface on the corresponding front side. Each of the centering surfaces passes into the neighboring front surfaces of the base body.

In accordance with a particularly advantageous embodiment, the front surfaces or the fastening surfaces created by the introduction of centering surfaces in the corner areas of these with an annulus-shaped design of the functional surfaces on the front sides are provided with means for implementing a fastening of the seal holder. In the simplest case, these are arranged as simple threaded holes that work together with the fastening elements. The fastening of the seal holder thus takes place in the low-stress area and the mounting of the seal is not subjected to the deformations on the yoke eye.

Another particularly advantageous embodiment that is economical in terms of production consists in that the entire front surface from the base body around the respective pins functions as the functional surface. The fastening and centering of the seal holder then takes place on each of the neighboring front sides of the base body, whereby they, in turn, can be functional surfaces.

The functional surface can be incorporated through grinding or cutting. The contact surfaces are preferably hardened, whereby carburizing hardening and inductive hardening are considered as the hardening procedures. The hardness run-out can thereby extend into the transfer area.

BRIEF DESCRIPTION OF THE DRAWINGS

The solution according to the invention is explained below using figures. The figures show the following.

DETAILED DESCRIPTION

When used in a universal-joint shaft arrangement, the seal holder, which is now attached to the spider, can easily be removed without having to dismantle the entire bearing assembly.

Figure 1A:
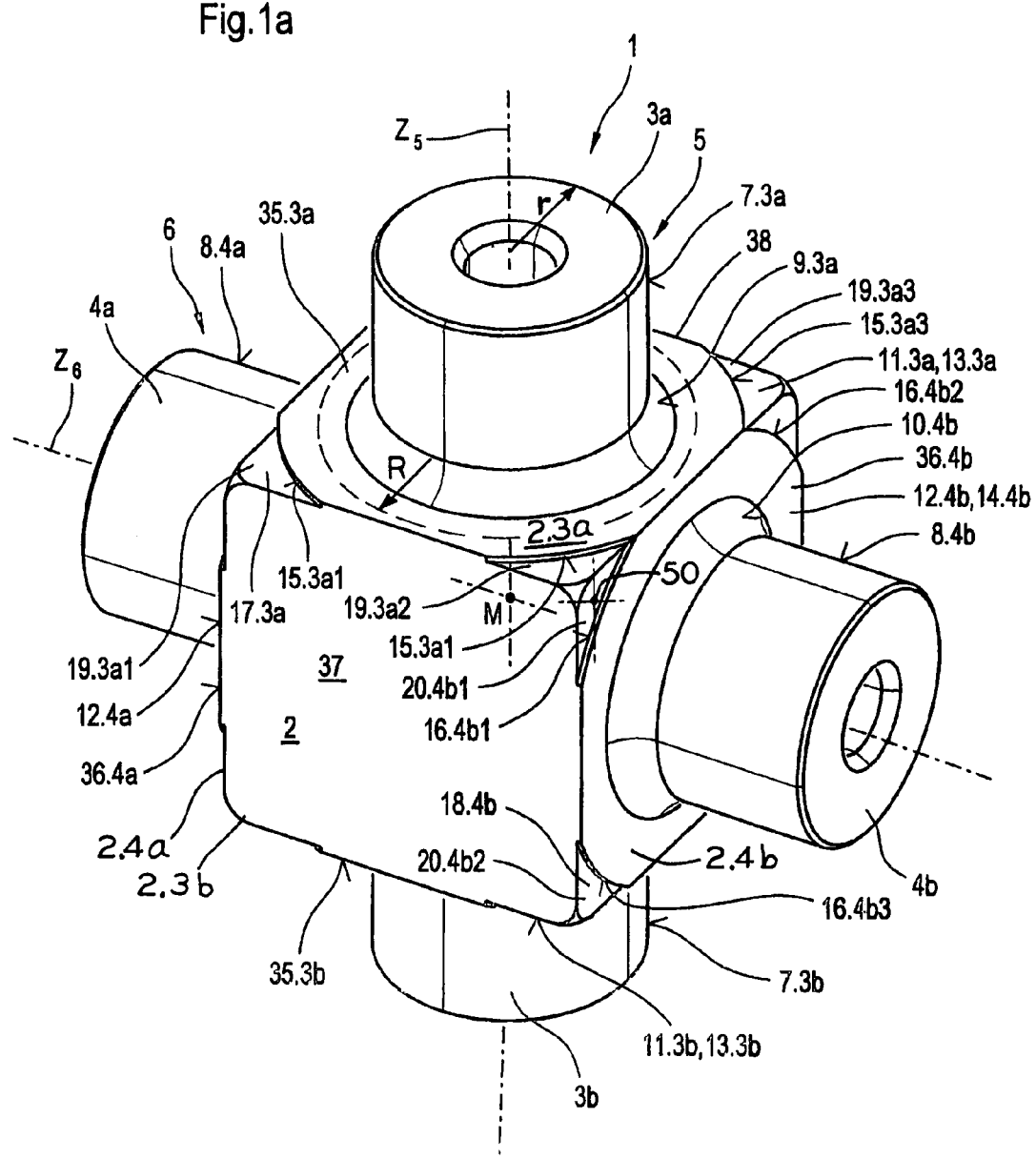
FIGS. 1a and 1b clarify, in a schematically simplified illustration, the basic structure of a spider in accordance with the invention.
Figure 1B:
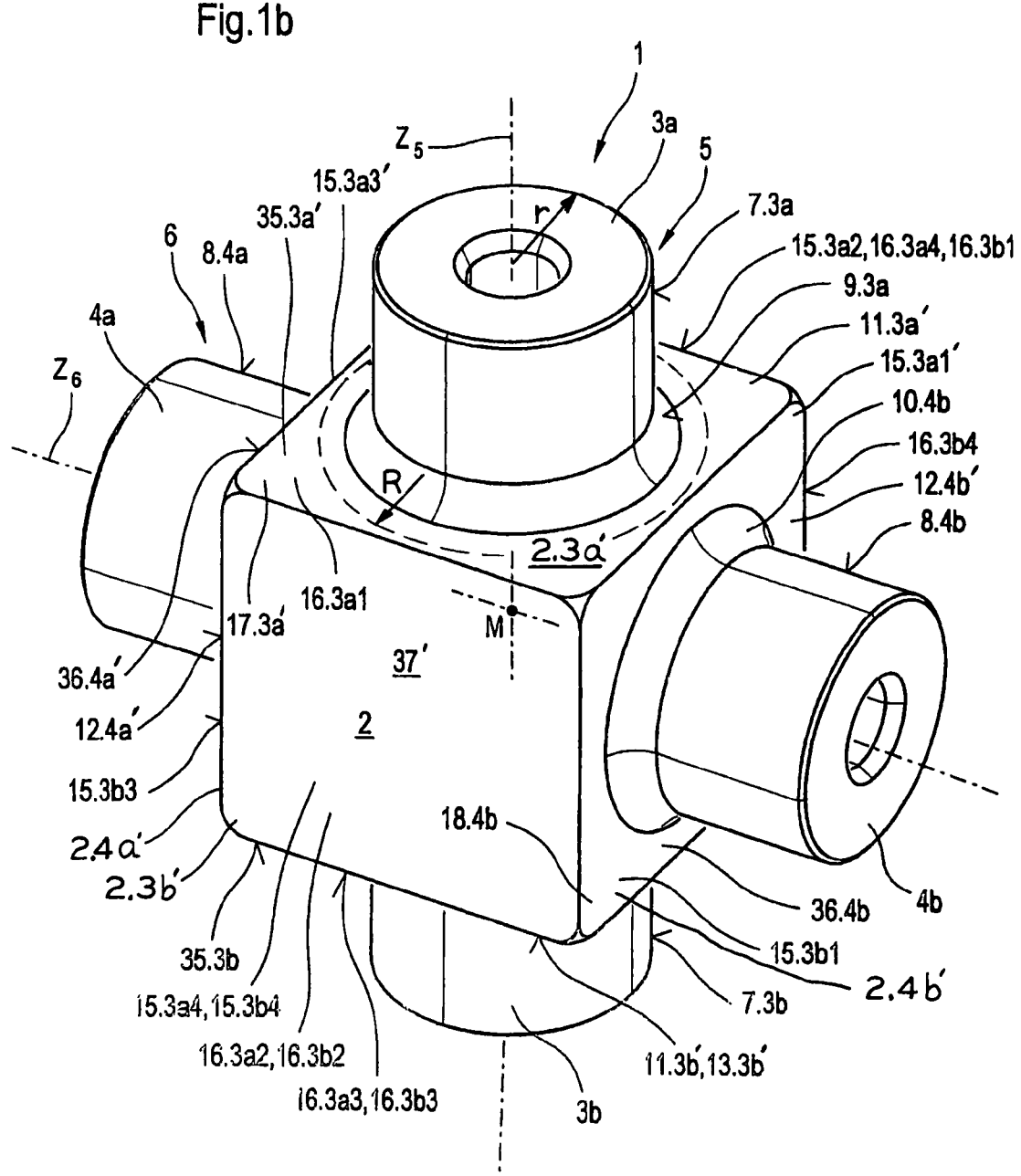
Figure 2:
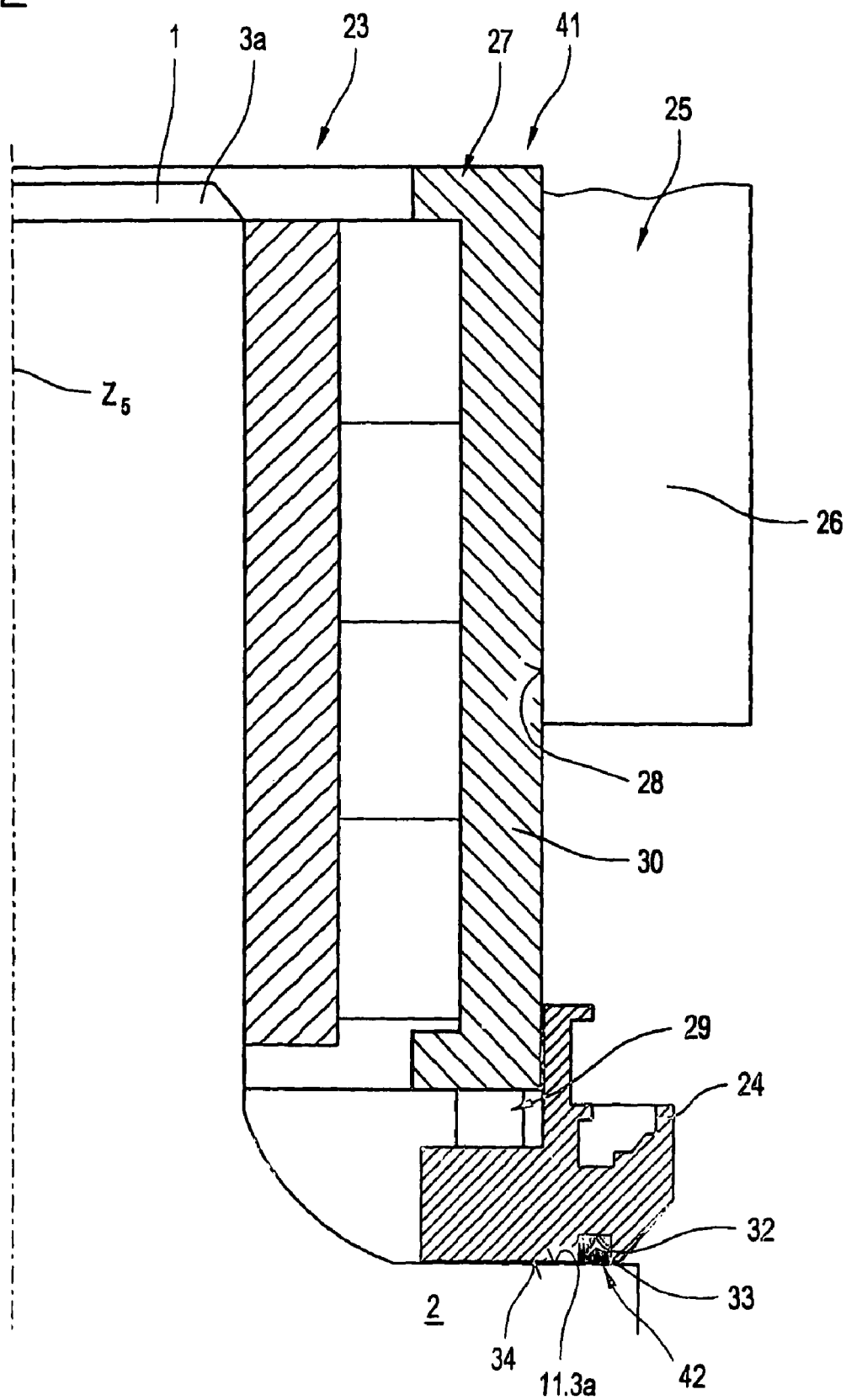
FIG. 2 shows the axial cross-section of a universal-joint shaft arrangement in accordance with the invention.

FIGS. 1a and 1b show, in a schematically simplified illustration, a perspective view of the basic structure of a spider 1 in accordance with the invention for use in universal-joint shafts. The basic structure is mainly identical, which is why the same reference numbers are used for the same elements with the numerals in FIG. 1b for the elements that are modified designated with a "prime" notation. It comprises a base body 2 arranged around a center point M of the spider and four protruding pins 3a and 3b or 4a and 4b starting from the base body and extending away from the center point M, whereby the pins 3a and 3b form a first pair of pins 5 and the pins 4a and 4b form a second pair of pins 6, whereby each pair of pins is characterized by a common pin axis $Z_5$ and $Z_6$. The pin axes $Z_5$ and $Z_6$ thereby intersect at center point M of the spider 1 at a right angle. The individual pins 3a, 3b and 4a or 4b have a cylindrical and concentric surface 7.3a, 7.3b arranged around the respective pin axis $Z_5$ and $Z_6$ for the pins 3a and 3b or 8.4a and 8.4b for the pins 4a and 4b. This surface thereby either directly forms the contact surface for rolling elements of a roller bearing or a support surface for the element carrying the contact surface of a radial bearing, in particular the inner ring of a radial bearing or roller bearing. A transfer area 9.3a or 9.3b is provided between each of the surfaces 7.3a, 7.3b or 8.4a and 8.4b and the base body 2 for the pins 3a and 3b and 10.4a and 10.4b for the pins 4a and 4b, whereby only 9.3a and 10.4b are shown here. This can be implemented in many forms, but is characterized by an increase in the outer diameter of the respective pins 3a and 3b or 4a and 4b. The base body 2 then forms a functional surface 11.3a or 11.3b arranged at an angle, preferably perpendicular to the surfaces 7.3a, 7.3b or 8.4a and 8.4b, or through the pin axes $Z_5$ and $Z_6$ of two pins located next to each other in the circumferential direction, planes 3a and 4b here, for the pins 3a and 3b and 12.4a or 12.4b for the pins 4a and 4b for supporting at least one seal inserted in a seal holder. The contact surfaces 11.3a, 11.3b or 12.4a and 12.4b are thereby preferably formed by a ring-shaped shoulder 13.3a or 13.3b and 14.4a or 14.4b, whereby the surface extending at an angle or perpendicular to the functional surface on the base body 2 functions as a centering surface (shown here) 15.3a1, 15.3a3 and, 16.4a2. In accordance with the invention, the functional surface 11.3a or 11.3b for the pins 3a and 3b and 12.4a or 12.4b for the pins 4a and 4b thereby extends into an area having a radius R which is equal to or larger than 1.5 times the radius r of the pin 3a, 3b or 4a or 4b. This is arranged planar, preferably by grinding or lathing. Furthermore, each of the functional surfaces forms a sealing surface 35.3a or 35.3b for the functional surfaces 11.3a and 11.3b and 36.4a and 36.4b for the functional surfaces 12.4a and 12.4b in a partial area through the support of at least one sealing ring inserted in a seal holder. It thereby becomes part of a seal pairing of a tangential seal. In accordance with a particularly advantageous embodiment, the cross-section of base body 2 is characterized by a cross-sectional form that is mainly square, preferably quadratic. The base body 2 is thus shaped like a cube.

The individual function surface thereby extends, as shown in FIG. 1b, either over the entire front surface running from the base body perpendicular to the plane stretched by the pin axes $Z_5$ and $Z_6$ of two pins, for example 3a and 4b, located next to each other in the circumferential direction. In this case, the functional surfaces of the pins arranged next to each other in the circumferential direction and the front surfaces 37 and 38 free of a pin 3a, 3b, 4a, 4b on the base body 2 function as centering surfaces 15.3a1-15.3a4, 15.3b1-15.3b4 and 16.3a1-16.3a4 or 16.3b1-16.3b4 and the front surfaces 37 and 38. The functional surfaces 11.3a, 11.3b or 12.4a, 12.4b are, in this case, not designed symmetrical in terms of rotation or annulus, but rather extend into the end areas of the base body 2. In another case, shown in FIG. 1a, the functional surfaces 11.3a, 11.3b or 12.4a, 12.4b are formed by the ring-shaped shoulder 13.3a and 13.3b, which is incorporated in the base body. The centering surfaces 15.3a1-15.3a4, 15.3b1-15.3b4 are designed to run perpendicular to the functional surface 11.3a, 11.3b or 12.4a, 12.4b. The centering surfaces are thereby arranged in an area, which is not particularly meaningful for the transfer of torque and is thus in a low-stress area. Each of the centering surfaces thereby serves to center the seal supported on the functional surfaces 11.3a, 11.3b or 12.4a, 12.4b. This seal is also preferably supported on base body 2.

The functional surfaces 11.3a, 11.3b and 12.4a and 12.4b preferably always serve directly as sealing surface 35.3a, 35.3b, 36.4a, 36.4b, i.e. that they must have a corresponding surface design that allows the formation of a seal effect within a seal pairing. The centering surfaces 15.3a1-15.3a4, 15.3b1-15.3b4 and 16.3a1-16.3b4 thereby form the centering surfaces for the arrangement element carrying the seal, whereby this element is fastened on the base body 2. Means 17.3a or 17.3b and 18.4a and 18.4b are thereby provided for the realization of a torque-proof connection of the base body 2 with the seal-carrying component. These means have, for example, a threaded bore 50 on the base body. The fastening thereby preferably takes place in the vicinity of the areas 19.3a1 through 19.3a4-19.3b1-19.3b4 or 20.4a1-20.4a4-20.4b4 free of the functional surface 11.3a, 11.3b or 12.4a or 12.4b on the base body 2 in the version shown in FIG. 1a.

In the embodiment in accordance with FIG. 1b, the fastening surfaces of the functional surfaces 11.3a, 11.3b or 12.4a, 12.4b and the front sides 37 and 38 are also designed on the base body 2.

In accordance with a particularly advantageous embodiment, the spider 1, preferably at least a contact surface for the rolling elements of a roller bearing or a support surface for the element carrying the contact surface of a roller bearing, is hardened. The hardness roll-out thereby preferably extends into the low-stress area, i.e. into the transfer area or partially beyond it. Carburizing hardening and inductive hardening are considered for the hardening procedures. The specific selection depends on the specific requirements of the application and is left to the discretion of the responsible expert.

Due to the function of the functional surfaces 11.3a, 11.3b or 12.4a, 12.4b as sealing surfaces, it is at least characterized by an inner diameter, which is less than or equal to the seal, but preferably less than or equal to the element carrying the seal.

The surfaces 7.3a or 7.3b and 8.4a or 8.4b are preferably hardened in both embodiments. The hardening can thereby be inductive or through carburizing hardening. The hardness run-out thereby lies in the low-stress area of the shoulders 13.3a, 1.3b or 14.4a or 14.4b in the operating state of the spider. In accordance with another embodiment, the entire spider can be hardened, whereby the hardening procedure takes place according to known procedures or a hardening of the transfer areas can be provided subsequent to the hardening of the surface. The specific selection of the selected procedure and the hardness progression depends on the requirements of the application and is left to the discretion of the responsible expert.

FIG. 3 uses a section from an axial cross-section through a universal-joint shaft 23 using the spider 1 designed according to the invention to clarify the basic structure of a particularly advantageously designed universal-joint shaft arrangement with integrated seal holder 24. The universal-joint shaft 23 thereby has two link yokes arranged together at 90° in a torque-proof manner in the circumferential direction and in which the spider 1 is mounted. Only one section of the link yoke 25 is shown here, in particular the link-yoke halves 26, in which the pin 3a is mounted. A bearing assembly 41, comprising a radial bearing 27, is provided for the mounting and is arranged between spider 1, in particular pin 3a, and the yoke bore hole 28 in the link-yoke halves 26. It does not matter whether the link yoke 25 is a one-piece or two-piece arrangement or whether the yoke bore hole 26 is a blind bore hole or a through-hole. The axial bearing 29 is arranged in the area of the pin root. It is preferably supported on the outer ring 30 of the radial bearing 27. The seal holder 24 is arranged in the root area of the pin 3a for the sealing of the entire bearing assembly 41.

It preferably simultaneously serves as the support for one of the contact surfaces of the axial bearing. Embodiments without the formation of the support surface for the contact surface or the part forming the contact surface are also possible. In this case, the contact surface is formed by a separate component or in accordance with the arrangement of the bearing bushing forming the inner ring of the radial bearing. The seal holder thereby surrounds the bearing arrangement 41, in particular the radial bearing 27, at least partially in the area of its axial extension in the circumferential direction and furthermore the axial bearing. A recess 32, in which the seal element 33 is arranged, is provided in a surface directed towards the base body 2 in the installation position. This forms a seal pairing 42 with the functional surface 11.3a in the installation position, whereby the surface 34 can, but does not have to, also lie against the functional surface 11.3a. The immobilization of the seal holder 24 in the axial direction, i.e. in a direction, which can be described by a vector parallel to the pin axis $Z_5$, takes place on the base body 2 through the position assignment in this direction to the base body 2. The immobilization in the circumferential direction is determined by the individual components of the bearing assembly, in particular the radial and axial bearings.

The invention claimed is:

1. A universal-joint shaft arrangement for prop shafts suitable for the transfer of torque having at least one spider, said shaft arrangement comprising:
   at least one link yoke;
   pins arranged around a center point and extending from a base body in pairs around a common axis, whereby the axes cross at the center point of the spider at a right angle;
   each pin having a surface arranged concentrically around the respective pin axis and forming a contact surface or a surface for supporting rolling elements of a roller bearing;
   a transition area between the surface forming a contact surface or supporting a contact surface and the base body;
   a functional surface formed on sides of the base body facing the respective pin and attached to each pin for supporting at least one seal element by forming a sealing surface of a seal pairing;
   the functional surface running perpendicular to a plane which is defined by the pin axis of the respective pin and the pin arranged next to it in the circumferential direction;
   the functional surface extending from the transition area at least into an area in the radial direction around the pin axis having a radius which is at least 1.5 times the respective pin radius;
   at least one centering surface arranged perpendicular to the respective functional surface for the immobilization of a seal holder carrying a sealing device and attached to each functional surface;
   a bearing assembly of each pin comprising at least one radial bearing and one axial bearing mounted in the area of a respective pin root;
   the bearing assembly sealed by means of the respective seal which is mounted in the seal holder;
   the seal forming the seal pairing with the side of the base body associated with the respective pin;
   the seal holder being attached to the spider.

2. The universal joint shaft in accordance with claim 1 wherein the functional surfaces on the spider are planar.

3. The universal joint shaft in accordance with claim 2 wherein the functional surface on the spider extends over the entire respective side formed by the base body.

4. The universal joint shaft in accordance with claim 2 wherein the functional surface on the spider is annular in the radial direction around the pin axis of the respective pin.

5. The universal joint shaft in accordance with claim 2 wherein the base body is shaped by a cube.

6. The universal joint shaft in accordance with claim 1 wherein the functional surfaces on the spider extend over the entire side formed by the base body.

7. The universal joint shaft in accordance with claim 6 wherein the functional surface on the spider is annular in the radial direction around the pin axis of the respective pin.

8. The universal joint shaft in accordance with claim 1 wherein the functional surfaces on the spider are annular in the radial direction around the pin axis of the respective pin.

9. The universal joint shaft in accordance with claim 1 wherein the base body is shaped like a cube.

10. The universal joint shaft in accordance with claim 9 wherein the centering surfaces attached to a functional surface are formed by the neighboring sides.

11. The universal joint shaft in accordance with claim 9 wherein the centering surfaces attached to a functional surface are arranged on the same side of the base body and the base body is provided with means for fastening the seal holder carrying the seal and which are at least partially arranged on the same side and/or on the neighboring sides.

12. The universal joint shaft in accordance with claim 11 wherein the means are designed as threaded bore holes.

13. The universal joint shaft in accordance with claim 1 wherein the transition area is characterized by an increase in the diameter of the pin and a radius progression with a decreasing radius.

14. The universal joint shaft in accordance with claim 1 wherein the individual functional surface and/or centering surface is ground.

15. The universal joint shaft in accordance with claim 1 characterized in that the individual functional surface and/or centering surface is lathed.

16. The universal joint shaft in accordance with claim 1 wherein the surface forming a contact surface or indirectly supporting the contact surface is hardened.

17. The universal joint shaft in accordance with claim 16 wherein a hardness run-out extends into the transition area.

18. The universal joint shaft in accordance with claim 17 wherein the base body is shaped like a cube.

19. The universal joint shaft in accordance with claim 16 wherein carborizing hardening or inductive hardening are used as the hardening procedure.

* * * * *